United States Patent
Holcombe et al.

(10) Patent No.: US 9,887,023 B2
(45) Date of Patent: *Feb. 6, 2018

(54) TRACEABLE AND THEFT DETERRENT RECLAIMABLE PRODUCT

(71) Applicant: Southwire Company, LLC, Carrollton, GA (US)

(72) Inventors: Charles L. Holcombe, Newnan, GA (US); Ronald J. Burchfield, Carrollton, GA (US); Carol J. Godfrey, Roswell, GA (US); Stephen L. Spruell, Carrollton, GA (US); John N. Ware, Jr., Villa Rica, GA (US); Edward J. Easterwood, Jr., Carrollton, GA (US); W. Steve Wilson, Carrollton, GA (US); Frank Hullender, Villa Rica, GA (US); Charles Douglas Glore, Austell, GA (US)

(73) Assignee: Southwire Company, LLC, Carrollton, GA (US)

( * ) Notice: Subject to any disclaimer, the term of this patent is extended or adjusted under 35 U.S.C. 154(b) by 352 days.

This patent is subject to a terminal disclaimer.

(21) Appl. No.: 14/732,996

(22) Filed: Jun. 8, 2015

(65) Prior Publication Data
US 2015/0270030 A1    Sep. 24, 2015

Related U.S. Application Data

(60) Division of application No. 12/433,440, filed on Apr. 30, 2009, now Pat. No. 9,053,841, which is a
(Continued)

(51) Int. Cl.
*H01B 7/36* (2006.01)
*G06Q 50/06* (2012.01)
(Continued)

(52) U.S. Cl.
CPC ........... *H01B 7/365* (2013.01); *B23K 26/362* (2013.01); *G06Q 10/087* (2013.01); *G06Q 50/06* (2013.01); *H01B 7/361* (2013.01); *H02G 2200/10* (2013.01)

(58) Field of Classification Search
CPC ...... H01B 7/365; H01B 7/361; B23K 26/362; G06Q 10/087; G06Q 50/06; H02G 2200/10
(Continued)

(56) References Cited

U.S. PATENT DOCUMENTS

| 951,147 A | 3/1910 | Porter |
| 1,274,788 A | 8/1918 | Saunders |

(Continued)

FOREIGN PATENT DOCUMENTS

| DE | 409794 C | 2/1925 |
| DE | 2219612 | 11/1973 |

(Continued)

OTHER PUBLICATIONS

U.S. Final Office Action dated Nov. 4, 2016 cited in U.S. Appl. No. 13/281,489, 12 pgs.
(Continued)

*Primary Examiner* — A Hunter Wilder
*Assistant Examiner* — Joseph M Mutschler
(74) *Attorney, Agent, or Firm* — Merchant & Gould P.C.

(57) ABSTRACT

A theft deterrent cable may be provided. First, a plurality of unique codes may be created. Then a plurality of indicia may be placed periodically and longitudinally on the interior of the cable that may not be viable from the exterior of the cable. The plurality of indicia may respectively correspond to the plurality of unique codes. An indicator may be placed on the exterior of the cable. In a database, the plurality of unique codes may be assigned to an organizational entity.

(Continued)

The organizational entity may comprise a first enterprise. Next, an indication that the cable is to be transferred from the first enterprise to a second enterprise may be received. In response to the received indication, the plurality of unique codes may be assigned in the database from the organizational entity comprising the first enterprise to the organizational entity comprising a second enterprise.

20 Claims, 5 Drawing Sheets

Related U.S. Application Data continuation-in-part of application No. 12/269,110, filed on Nov. 12, 2008, now Pat. No. 8,234,034.

(60) Provisional application No. 60/987,566, filed on Nov. 13, 2007.

(51) Int. Cl.
   *G06Q 10/08* (2012.01)
   *B23K 26/362* (2014.01)

(58) Field of Classification Search
   USPC .......................................... 705/28; 174/112
   See application file for complete search history.

(56) References Cited

U.S. PATENT DOCUMENTS

| | | |
|---|---|---|
| 1,613,858 A | 1/1927 | Vogl |
| 2,745,436 A | 5/1956 | Battle et al. |
| 2,867,001 A | 1/1959 | Lewis et al. |
| 2,992,292 A * | 7/1961 | Brown ............ G02B 6/4482 106/31.9 |
| 3,197,554 A | 7/1965 | Baker |
| 3,229,623 A | 1/1966 | Rubinstein et al. |
| 3,328,514 A | 6/1967 | Cogelia |
| 3,551,542 A | 12/1970 | Perrone |
| 4,029,006 A | 6/1977 | Mercer |
| 4,216,645 A | 8/1980 | Andersen |
| 4,368,350 A | 1/1983 | Perelman |
| 4,370,542 A | 1/1983 | Mills et al. |
| 4,609,208 A | 9/1986 | Wrobel |
| 4,955,154 A | 9/1990 | Moss |
| 4,997,994 A | 3/1991 | Andrews et al. |
| 5,001,303 A | 3/1991 | Coleman et al. |
| 5,049,721 A | 9/1991 | Parnas et al. |
| 5,110,638 A | 5/1992 | Vogdes et al. |
| 5,140,319 A | 8/1992 | Riordan |
| 5,237,917 A | 8/1993 | Traut et al. |
| 5,243,128 A | 9/1993 | Marcoz |
| 5,280,251 A | 1/1994 | Strangio |
| 5,289,767 A | 3/1994 | Montalto et al. |
| 5,350,885 A | 9/1994 | Falciglia et al. |
| 5,423,112 A | 6/1995 | Murphy et al. |
| 5,444,466 A | 8/1995 | Smyczek et al. |
| 5,466,011 A | 11/1995 | Cohn |
| 5,474,627 A | 12/1995 | Carriere et al. |
| 5,557,071 A | 9/1996 | Falciglia et al. |
| 5,745,628 A | 4/1998 | Benzel et al. |
| 5,809,194 A | 9/1998 | Lovie |
| 5,862,774 A | 1/1999 | Moss |
| 5,949,050 A | 9/1999 | Fosbenner et al. |
| 6,114,633 A | 9/2000 | Duhancik |
| 6,293,081 B1 | 9/2001 | Grulick et al. |
| 6,311,637 B1 | 11/2001 | Moss |
| 6,316,730 B1 | 11/2001 | Stelzi |
| 6,404,972 B1 | 6/2002 | Pasch et al. |
| 6,466,941 B1 | 10/2002 | Rowe et al. |
| 6,486,395 B1 | 11/2002 | Temblador |
| 6,560,390 B2 | 5/2003 | Grulick et al. |
| RE38,345 E | 12/2003 | Falciglia et al. |
| 6,727,433 B2 | 4/2004 | Tsai |
| 6,825,418 B1 | 11/2004 | Dollins et al. |
| 6,906,264 B1 | 6/2005 | Grant, Jr. et al. |
| 7,202,959 B2 | 4/2007 | Silverbrook et al. |
| 7,383,284 B2 | 6/2008 | Heinrichs et al. |
| 7,468,489 B2 | 12/2008 | Alrutz |
| 7,528,319 B2 | 5/2009 | Kondo et al. |
| 7,991,652 B2 | 8/2011 | Chamberlain |
| 8,234,304 B2 | 7/2012 | Holcombe et al. |
| 8,450,612 B2 | 5/2013 | McEllen et al. |
| 9,053,841 B2 | 6/2015 | Holcombe et al. |
| 9,818,508 B2 | 11/2017 | Holcombe et al. |
| 2002/0092670 A1 | 7/2002 | Fang et al. |
| 2004/0024782 A1 | 2/2004 | Chamberlain |
| 2005/0016754 A1 | 1/2005 | Dollins et al. |
| 2005/0040641 A1 | 2/2005 | Cote et al. |
| 2006/0109131 A1 | 5/2006 | Sen et al. |
| 2007/0248305 A1 | 10/2007 | Alrutz |
| 2007/0284871 A1 | 12/2007 | Gray |
| 2008/0246272 A1 | 10/2008 | Vast et al. |
| 2008/0271919 A1 | 11/2008 | Elko |
| 2009/0032985 A1 | 2/2009 | Alrutz |
| 2009/0084575 A1 | 4/2009 | Dollins et al. |
| 2009/0138514 A1 | 5/2009 | Holcombe et al. |
| 2009/0188694 A1 | 7/2009 | Pereira et al. |
| 2009/0242232 A1 | 10/2009 | Holcombe et al. |
| 2009/0250920 A1 | 10/2009 | Isherwood et al. |
| 2010/0166374 A1 | 7/2010 | Lapp |
| 2010/0264206 A1 | 10/2010 | Holcombe et al. |
| 2011/0220386 A1 | 9/2011 | Temblador et al. |
| 2012/0042978 A1 | 2/2012 | Holcombe et al. |
| 2013/0062873 A1 | 3/2013 | Holcombe et al. |
| 2014/0048607 A1 | 2/2014 | Holcombe et al. |
| 2014/0190740 A1 | 7/2014 | Debladis et al. |

FOREIGN PATENT DOCUMENTS

| | | |
|---|---|---|
| DE | 202007009370 U1 | 11/2007 |
| DE | 102009043164 A1 | 4/2010 |
| DE | 102008063086 A1 | 7/2010 |
| EP | 0256422 A1 | 2/1988 |
| EP | 1557846 A1 | 7/2005 |
| EP | 2096645 A1 | 9/2009 |
| EP | 2117011 A1 | 11/2009 |
| EP | 2202758 A2 | 6/2010 |
| EP | 2220626 B1 | 6/2013 |
| FR | 2976714 A1 | 12/2012 |
| JP | 08190814 A | 7/1996 |
| JP | 2001035266 A | 2/2001 |
| JP | 2001189112 A | 7/2001 |
| JP | 2004265624 | 9/2004 |
| JP | 2006127896 | 5/2006 |
| WO | 0071350 A1 | 11/2000 |
| WO | 02079924 A2 | 10/2002 |
| WO | 2006046216 A3 | 5/2006 |
| WO | 2009064772 A1 | 5/2009 |
| WO | 2011024144 A1 | 3/2011 |
| WO | 2011153303 A2 | 12/2011 |
| WO | 2014031361 A1 | 2/2014 |

OTHER PUBLICATIONS

U.S. Office Action dated Nov. 15, 2016 cited in U.S. Appl. No. 12/792,150, 18 pgs.
U.S. Final Office Action dated Nov. 25, 2015 cited in U.S. Appl. No. 13/281,489, 34 pgs.
U.S. Office Action dated Dec. 2, 2015 cited in U.S. Appl. No. 12/792,150, 29 pgs.
European Communication dated Jan. 25, 2017 cited in Application No. 14 180 329.6, 10 pgs.
Granville Henry Mason Jackson, "Method for manufacturing electrical cables, involves winding strips or filament that bears multiple microdots with cable wire in a manner in which strip is difficult to be removed from cable," WPI / Thomson, vol. 2011, No. 67, Jun. 30, 2010, XP002691642, 1 pg.
U.S. Office Action dated Feb. 26, 2016 cited in U.S. Appl. No. 13/658,852, 37 pgs.

(56) References Cited

OTHER PUBLICATIONS

Chilean Examiner's Second Report dated Dec. 7, 2016 cited in Application No. 2015/000318, 15 pgs.
Canadian Office Action dated Jan. 16, 2017 cited in Application No. 2,705,514, 6 pgs.
Chilean Examiner's First Report dated May 31, 2016 cited in Application No. 2015/000318, 13 pgs.
Canadian Office Action dated Dec. 4, 2015 cited in Application No. 2,705,514, 6 pgs.
Australian Examination Report No. 1 dated Dec. 2, 2016 cited in Application No. 2013306220, 4 pgs.
U.S. Office Action dated Jun. 27, 2017 cited in U.S. Appl. No. 13/281,489, 29 pgs.
U.S. Office Action dated Mar. 24, 2017 cited in U.S. Appl. No. 13/963,002, 132 pgs.
U.S. Final Office Action dated Jan. 26, 2017 cited in U.S. Appl. No. 13/658,852.
Canadian Office Action dated May 13, 2016 cited in Application No. 2,760,457, 4 pgs.
U.S. Final Office Action dated Apr. 21, 2016 cited in U.S. Appl. No. 12/792,150, 18 pgs.
U.S. Office Action dated Jun. 15, 2016 cited in U.S. Appl. No. 13/281,489, 29 pgs.
International Search Report dated Jan. 20, 2009 cited in Application No. PCT/US2008/083217, 15 pgs.
International Search Report dated Nov. 19, 2010 cited in Application No. PCT/US2010/032804, 8 pgs.
European Communication dated Mar. 16, 2011 cited in Application No. 08 850 163.0, 5 pgs.
International Search Report dated Jan. 13, 2012 cited in Application No. PCT/US2011/038857, 9 pgs.
Mexican Office Action dated Mar. 15, 2013 cited in Application No. MX/a/2011/011522, 7 pgs.
Extended European Search Report dated May 16, 2013 cited in Application No. 13158514.2, 20 pgs.
International Search Report dated Oct. 14, 2013 cited in Application No. PCT/US2013/054257, 15 pgs.
Canadian Office Action dated Dec. 31, 2013 cited in Application No. 2,705,514, 3 pgs.
European Office Action dated Jun. 4, 2014 cited in Application No. 13 159514.2, 7 pgs.
Canadian Office Action dated Sep. 2, 2014 cited in Application No. 2,705,514, 3 pgs.
U.S. Office Action dated Aug. 19, 2011 cited in U.S. Appl. No. 12/269,110, 23 pgs.
U.S. Office Action dated Oct. 19, 2012 cited in U.S. Appl. No. 12/792,640, 33 pgs.
U.S. Office Action dated Jan. 14, 2013 cited in U.S. Appl. No. 12/792,150, 27 pgs.
U.S. Final Office Action dated Jun. 20, 2013 cited in U.S. Appl. No. 12/792,640, 23 pgs.
U.S. Final Office Action dated Jun. 24, 2013 cited in U.S. Appl. No. 12/792,150, 16 pgs.
U.S. Final Office Action dated Oct. 24, 2013 cited in U.S. Appl. No. 12/792,640, 25 pgs.
U.S. Office Action dated Oct. 29, 2013 cited in U.S. Appl. No. 13/281,489, 27 pgs.
U.S. Office Action dated Feb. 28, 2014 cited in U.S. Appl. No. 12/792,640, 22 pgs.
U.S. Final Office Action dated Apr. 24, 2014 cited in U.S. Appl. No. 13/281,489, 18 pgs.
U.S. Office Action dated Jun. 3, 2014 cited in U.S. Appl. No. 13/658,852, 34 pgs.
U.S. Office Action dated Oct. 7, 2014 cited in U.S. Appl. No. 13/658,852, 34 pgs.
U.S. Office Action dated Dec. 18, 2014 cited in U.S. Appl. No. 12/792,150, 49 pgs.
Consumer's Energy Theft, inFocus for Employees of CMS Energy Companies, Jan. 19, 2009, 1 pg.
"Copper Theft Baseline Survey of Utilities in the United States", Electrical Safety Foundation International, Jan. 2009, www.electrical-safety.org, 11 pgs.
"Police, property owners employing extra measure to thwart copper thieves," OnlineAthens, Athens Banner-Herald, Jul. 11, 2011, 2 pgs., http://www.onlineathens.com/stores/071011/new_855051647.shtml.
"Electric Utilities Across the State Offer $500 Reward for Identification of Copper Thieves," A Joint News Release, Feb. 11, 2009, 2 pgs.
DataDot Technology—On the cutting edge, http://web.archive.org/web/20071021130607/http://www.datadotdna.com/dtl_technology . . . , Copyright 2005, 5 pgs.
Utility T&D Automation & Engineering (magazine), Shining a Light on Blackout Prevention, www.utility-automation.com, Apr. 2008, 5 pgs.
Utility T&D Automation & Engineering (magazine), Wind on the Wires, www.utility-automation.com, May 2008, 2 pgs.
NYSE Euronext, European Equities, Nexans Awarded First CORE-TAG® Anti-Theft Cable Technology Contract by SNCF for the Network of Réseau Ferré de France (RFF), ISIN # FR0000044448, Released: Nov. 26, 2012, 2 pgs.
Nexans Global Expert in Cables and Cabling Systems, "Anti-theft solutions for copper cables," May 12, 2012, 4 pgs., http://www.nexans.com/eservice/Corporate-en/navigate_295195/Anti_theft_solutions_for_copper_cables.html.
European Search Report dated Feb. 16, 2015 cited in Application No. 14180329.6, 14 pgs.
U.S. Final Office Action dated Apr. 2, 2015 cited in U.S. Appl. No. 12/792,150, 20 pgs.
U.S. Office Action dated Apr. 3, 2015 cited in U.S. Appl. No. 13/281,489, 47 pgs.
European Extended Search Report dated May 21, 2015 cited in Application No. 10770274.8, 8 pgs.
U.S. Final Office Action dated Oct. 7, 2014 cited in U.S. Appl. No. 12/792,640, 37 pgs.
U.S. Final Office Action dated May 29, 2015 cited in U.S. Appl. No. 13/658,852, 37 pgs.
Australian First Examination Report dated Aug. 29, 2017 cited in Application No. 2014210629, 4 pgs.
U.S. Office Action dated Sep. 13, 2017 in U.S. Appl. No. 13/658,852, 35 pgs.
U.S. Final Office Action dated Sep. 20, 2017 in U.S. Appl. No. 13/963,002, 26 pgs.
U.S. Final Office Action dated Oct. 23, 2017 in U.S. Appl. No. 13/281,489, 18 pgs.
Canadian Office Action dated Oct. 17, 2017 in Application No. 2,705,514, 7 pgs.

* cited by examiner

TRACEABLE AND THEFT DETERRENT RECLAIMABLE PRODUCT

RELATED APPLICATIONS

This Application is a division of U.S. application Ser. No. 12/433,440 filed Apr. 30, 2009, which is a continuation-in-part (CIP) of U.S. application Ser. No. 12/269,110 filed Nov. 12, 2008, which issued on Jul. 31, 2012 as U.S. Pat. No. 8,234,034, which is incorporated herein by reference. Furthermore, under provisions of 35 U.S.C. § 119(e), U.S. application Ser. No. 12/269,110 (U.S. Pat. No. 8,234,034) claimed the benefit of U.S. Provisional Application No. 60/987,566 filed Nov. 13, 2007, which is incorporated herein by reference.

This divisional application is also related to U.S. application Ser. No. 12/792,150 filed Jun. 2, 2010 entitled "Traceable and Theft Deterrent Reclaimable Product"; U.S. application Ser. No. 13/281,489 filed Oct. 26, 2011 entitled "Traceable and Theft Deterrent Reclaimable Product,"; U.S. application Ser. No. 13/658,852 filed Oct. 24, 2012 entitled "Traceable and Theft Deterrent Reclaimable Product,"; and U.S. application Ser. No. 13/963,002 filed Aug. 9, 2013 entitled "Traceable and Theft Deterrent Reclaimable Product," which are assigned to the same assignee as the present application and expressly incorporated herein, in their entirety, by reference.

COPYRIGHTS

All rights, including copyrights, in the material included herein are vested in and the property of the Applicants. The Applicants retain and reserve all rights in the material included herein, and grant permission to reproduce the material only in connection with reproduction of the granted patent and for no other purpose.

BACKGROUND

Due to certain metals' economic value, these metals may be targeted for theft. While copper may not be considered a precious metal, it does have a high economic value. The same can be said for aluminum, though it may be valued less than copper. Electrical wire and cable may comprise metals such as aluminum and copper. Consequently, electrical wire and cable may be targeted for theft. For example, a thief may enter a warehouse storing electrical wire and cable and may steal the stored electrical wire and cable. As another example, a thief may enter an electrical substation operated by an electric utility in order to steal any electrical wire and cable used in the electrical substation. In the electrical substation example, the thief may target, for example, bare copper ground wires running throughout the electrical substation. Once stolen, the electrical wire and cable may be taken to a recycling center and sold as scrap metal. The recycling center's operator may have no way to distinguish between stolen electrical wire and cable and legitimate scrap electrical wire and cable in the conventional commercial course.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A theft deterrent cable may be provided. First, a plurality of unique codes may be created. Then a plurality of indicia may be placed periodically and longitudinally on the interior of the cable. The plurality of indicia may not be viable from the exterior of the cable. The plurality of indicia may respectively correspond to the plurality of unique codes. An indicator may be placed on the exterior of the cable. In a database, the plurality of unique codes may be assigned to an organizational entity. The organizational entity may comprise a first enterprise. Next, an indication that the cable is to be transferred from the first enterprise to a second enterprise may be received. In response to the received indication, the plurality of unique codes may be assigned in the database from the organizational entity comprising the first enterprise to the organizational entity comprising a second enterprise.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1A:
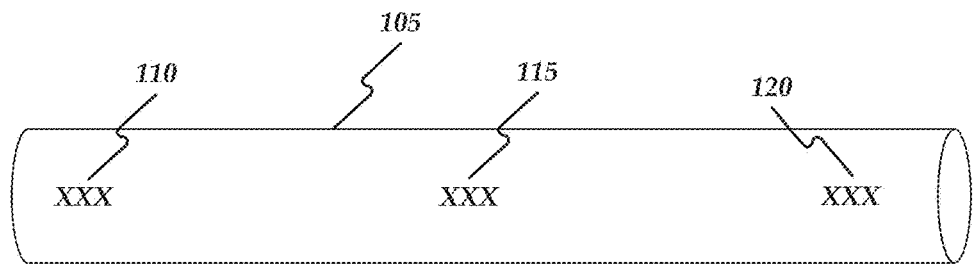
FIG. 1A is a diagram illustrating a bare solid conductor.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, a theft deterrent process may be provided. The process may provide traceability for any products (e.g. electrical wire, electrical cable, cathodes, etc.) that may be stolen and then recycled. The products may be metal-based and may have a high scrap monetary value. Products such as copper or aluminum cable can be bare or covered. Embodiments of the invention may provide, for example, a process for placing a number of highly tamper resistant traceable indicia on a product's surface. The indicia may include codes that may be continuously indexed and may be uniquely specific to the product having the indicia. At the product's sale and shipment point, the codes may be assigned to a specific order and/or end user. A computer based user interface and data storage system may allow for traceability at any point after sale by, for example, a scrap dealer, a customer, a law enforcement agency, or any other third party.

Embodiments of the invention may include a laser based marking system that may be able to mark at high line speeds onto, for example, a metal surface. Indicia including unique codes may be etched by the laser based marking system on the metal surface in periodic increments that may be spaced by several feet or longer. The code may also be printed without any spacing. Since the code may change with the product's length, when the product is later cut to a specific length, the code may help provide a length indication for the product to a specific order, end user, or designated third party. A computer system may store the unique traceable code for any desired length of time and may interface with another computer interface system. The computer system can be updated as the product's legitimate ownership changes hands. This interface can be used by a designated third party (e.g. scrap dealer, reclaimer, recycler, law enforcement, etc.) at any time to determine the product's ownership chain.

An ink based system (e.g. ink jet printers) may be used to print onto a covering or an indenting metal wheel may be used. A problem with ink on metal surfaces centers around adhesion. It may not be practical to clean drawing oils or other contaminants from cables completely prior to marking to improve adhesion. Also, many ink types do not stand up well to high temperatures or UV exposure over long time periods. Furthermore, when metals oxidize, ink may not provide an effective visual identification level. An indenting metal wheel may not be suitable due to manufacturing line speed considerations because the wheel may need a slow line speed. Also, interstices in many stranded conductors may not provide enough contact area for an effective indent marking by the wheel. Moreover, it may be difficult to index a marking wheel (due to mechanical limitations) to provide a unique indexable and traceable code.

Embodiments of the invention may provide a process to print (e.g. on a metal surface) with a laser source, chemical etching method, high temperature/high adhesion ink, high speed indexing printing wheel, or other processes for providing a highly tamper resistant traceable code. For example, a laser based printing system may be used to provide high speed, legibility, tamper resistance, and traceability. The laser system can have many different laser source types such as YAG and CO2. Furthermore, many different methods for focusing the intense laser energy on, for example, a metal surface may be used. Embodiments of the invention may also provide several ways to move a laser energy beam fast enough to print effectively at high line speeds. The print imparted by the laser beam may provide a highly tamper resistant marking. The laser beam may burn away metal (or other material) to a desired depth to provide a very long lasting marking when exposed to environment conditions. Or the marking process may only alter a surface appearance without physically removing any metal or other material. Not withstanding, this type marking may be legible when metal oxidizes and may not be compromised if the metal is exposed to high temperatures.

FIG. 1A is a diagram illustrating a bare solid conductor 105. Embodiments of the invention may provide solid conductor 105 with a plurality of indicia (e.g. a first indicia 110, a second indicia 115, and a third indicia 120) periodically and longitudinally on bare solid conductor 105. Bare solid conductor 105 may comprise, but is not limited to, copper or aluminum.

Figure 1B:
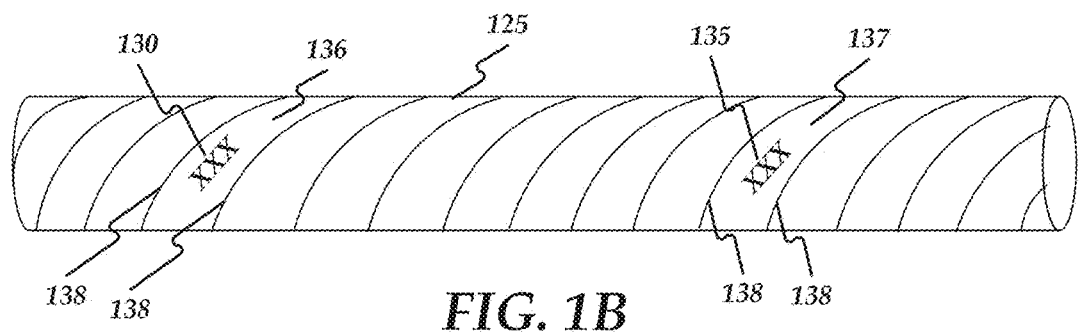
FIG. 1B is a diagram illustrating a stranded conductor.
Figure 1C:
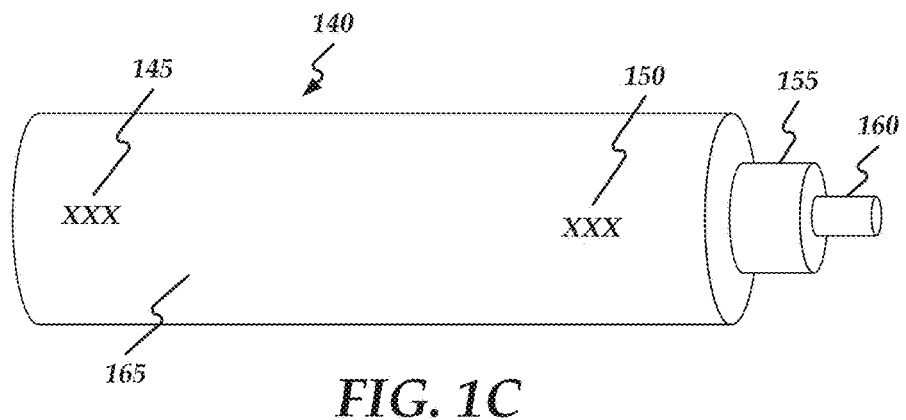
FIG. 1C is a diagram illustrating a multi-layered conductor.

FIG. 1B is a diagram illustrating a stranded conductor 125. Embodiments of the invention may provide stranded conductor 125 with a plurality of indicia (e.g. a fourth indicia 130 and a fifth indicia 135) periodically and longitudinally on stranded conductor 125. As shown in FIG. 1B, with stranded conductor 125, fourth indicia 130 and fifth indicia 135 may each be placed to respectively fit on a first individual strand 136 and a second individual strand 137 of stranded conductor 125. In this way, interstices 138 between stranded conductor 125's individual strands may be avoided by embodiments of the invention when fourth indicia 130 and a fifth indicia 135 are applied to stranded conductor 125. Notwithstanding, the indicia may or may not follow individual strand helix. Embodiments of the inventions may include placing the indicia along an axis parallel to the conductor axis as shown in FIGS. 1A and 1C. Indicia portions may fall into the interstices, but may still be visually or otherwise legible.

FIG. 1C is a diagram illustrating a multi-layered conductor 140. Embodiments of the invention may provide multi-layered conductor 140 with a plurality of indicia (e.g. a sixth indicia 145 and a seventh indicia 150) periodically and longitudinally on multi-layered conductor 140. As shown in FIG. 1C, multi-layered conductor 140 may include an interior layer 155, a conductor 160, and a jacket 165. Conductor 160 may comprise, but is not limited to, copper or aluminum. Conductor 160 may be configured in any way including, but not limited to, stranded or solid. Moreover, multi-layered conductor 140 may not be limited to conductor 160 and may include more than one conductor. Furthermore, multi-layered conductor 140 may include any number of layers. Any layer of multi-layered conductor 140 may be conductive, semi-conductive, or insulative. Consistent with embodiments of the invention, sixth indicia 145 and seventh indicia 150 may be placed on an exterior of any layer of multi-layered conductor 140. While FIG. 1C shows sixth indicia 145 and seventh indicia being placed on jacket 165, sixth indicia 145 and seventh indicia may be placed on the exterior of any one or more layers of multi-layered conductor 140. Moreover, sixth indicia 145 and seventh indicia may be placed on conductor 160 or on any one or more conductors of multi-layered conductor 140.

Figure 2:
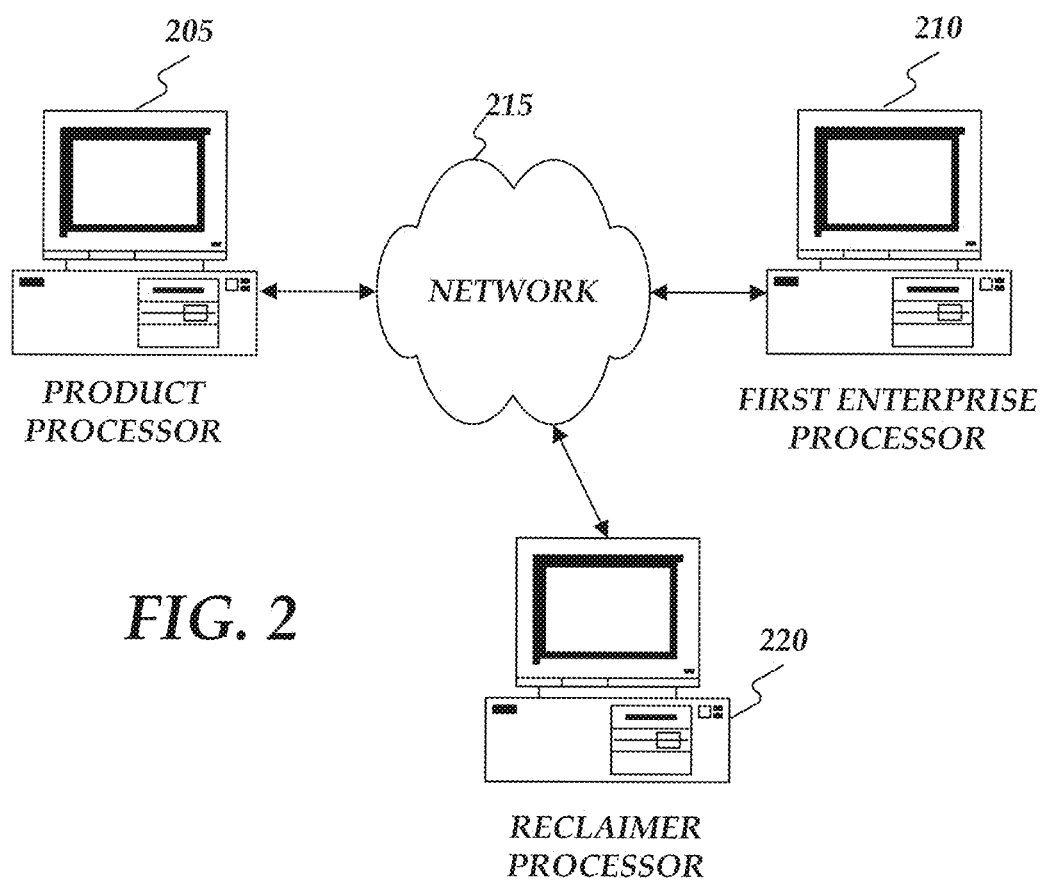
FIG. 2 is a block diagram of theft deterrent system.

FIG. 2 is a block diagram of theft deterrent system 200. As shown in FIG. 2, system 200 may include a product processor 205, a first enterprise processor 210, a network 215, and a reclaimer processor 220. Other processors (not shown) may be connected to network 215. System 200's product processor 205 may be descried in more detail below with respect to FIG. 4.

Embodiments consistent with the invention may comprise a system for providing a theft deterrent cable. The system may comprise a memory storage for maintaining a database and a processing unit coupled to the memory storage. The processing unit may be operative to create a plurality of unique codes and to place a plurality of indicia periodically and longitudinally on the cable. The plurality of indicia may respectively correspond to the plurality of unique codes. The processing unit may be further operative to assign, in a database, the plurality of unique codes to an organizational entity. The organizational entity may comprise a first enterprise. In addition, the processing unit may be further operative to receive an indication that the cable is to be transferred from the first enterprise to a second enterprise. Moreover, the processing unit may be operative to assign in the database, in response to the received indication, the plurality of unique codes from the organizational entity comprising the first enterprise to the organizational entity comprising a second enterprise.

Consistent with embodiments of the present invention, the aforementioned memories, processing units, and other components may be implemented in a system, such as theft deterrent system 200 of FIG. 2. Any suitable combination of hardware, software, and/or firmware may be used to implement the memories, processing units, or other components. By way of example, the memories, processing units, or other components may be implemented with product processor 205, first enterprise processor 210, or reclaimer processor 220 in combination with system 200. The aforementioned system and processors are exemplary and other systems and processors may comprise the aforementioned memories, processing units, or other components, consistent with embodiments of the present invention.

Figure 3:
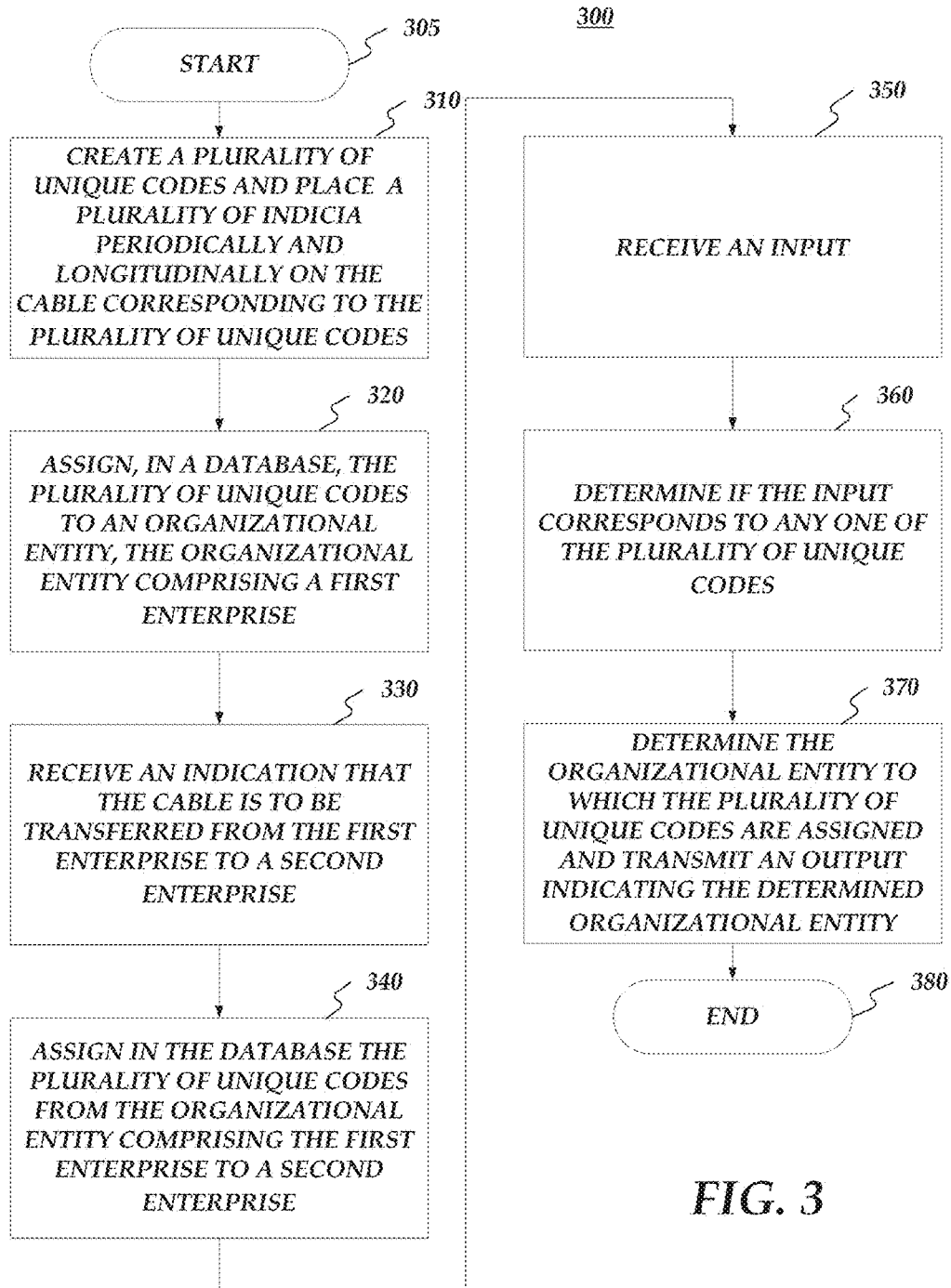
FIG. 3 is a flow chart of a method for providing a theft deterrent cable.

FIG. 3 is a flow chart setting forth the general stages involved in a method 300 consistent with embodiments of the invention for providing a theft deterrent cable. Method 300 may be implemented using product processor 205 as described in more detail below with respect to FIG. 4. Ways to implement the stages of method 300 will be described in greater detail below. Method 300 may begin at starting block 305 and proceed to stage 310 where product processor 205 may create a plurality of unique codes. For example, the plurality of unique codes may comprise any unique sequential number (e.g. alphanumeric) series. In addition each of the plurality of unique codes may also indicate a date and/or time the cable was manufactured, a manufacturing line on which the cable manufactured, a license under which certain rights are granted, a particular specification under which the cable is manufactured, a linear distance and a plant where the cable was manufactured.

After the plurality of unique codes are created, a plurality of indicia may be placed periodically and longitudinally on the cable a predetermined distance apart. The plurality of indicia may respectively correspond to the plurality of unique codes. Each one of the plurality of indicia may include a sequential number portion corresponding to a sequential number that may be incremented by an amount equal to the predetermined distance. For example, if each of the plurality of indicia are placed one foot apart, the sequential number portion may be incremented by one. If each of the plurality of indicia are placed the two feet apart, the sequential number portion may be incremented by two. Notwithstanding, the sequential number portion may indicate a linear distance from a reference point. The sequential number may be set or reset to zero (or any other value) at a given time (e.g., January 1 of a given year), when a certain order is completed, or when a certain license is granted.

The plurality of indicia may be placed using any unit of measurement (e.g., the Metric System) and is not limited to the English Measurement System or even specifically to footage markers within the English Measurement System. Furthermore, each of the plurality of indicia may be placed longitudinally on the cable at random distances apart from each other. Regardless of whether they are random or at a predetermined distance, the indicia may reflect an accurate linear distance for the placement of the indicia in the cable.

Consistent with embodiments of the invention, no space may exist between the indicia. In other words, the plurality of indicia may be continuous with no space between individual ones of the plurality of indicia. As described above with respect to FIG. 1A, FIG. 1B, and FIG. 1C, the plurality of indicia may be placed on an exterior of a cable, may be placed on an exterior of any layer of the cable, or may be placed on an exterior of any conductor of the cable. Moreover, the plurality of indicia may be placed while the cable is moving on a production line during manufacture of the cable using, for example, a laser. Notwithstanding, the plurality of indicia placed on the cable may be visually perceivable by a person. Moreover, as described above with respect to FIG. 1B, the plurality of indicia may be placed on an exterior of the conductor when the conductor is stranded. In this case each one of the plurality of indicia may be place to fit on strands of the stranded conductor. The aforementioned laser may comprise, but is not limited to, a Yag laser system manufactured by KBA-Metronic Corporation of Veitshoechheim, Germany.

Consistent with embodiments of the invention, a number of factors may be balanced in order to place the plurality of indicia on the cable. For example, the number of characters in an individual indicia and the time spent writing each character on the cable verses the line speed at which the cable is being manufactured may be balanced. For example, for a faster line speed: i) there may not be enough time to write enough characters to write a whole individual indicia; ii) there may not be enough time to write an individual indicia's characters deeply enough with a laser; or iii) there may not be enough time to properly write an individual indicia's characters with any writing or etching process. Consequently, in order to write individual indicia, the aforementioned line speed may need to be slowed. Slowing the line speed, however, may be undesirable.

Consistent with embodiments of the invention, in order to write individual indicia without slowing the line speed, a number of other ways to write the individual indicia may be used. For example, each individual indicia within the plurality of indicia may be broken into two or more pieces and the individual pieces may be alternating placed periodically and longitudinally on the cable at predetermined distances apart. For example, a first indicia in the plurality of indicia may be broken into a first piece and a second piece, a second indicia in the plurality of indicia may be broken into a first piece and a second piece, and a third indicia in the plurality of indicia may be broken into a first piece and a second piece. Then the indicia pieces may be placed sequentially on the cable at predetermined distances apart as follows: the first piece of the first indicia, the second piece of the first indicia, the first piece of the second indicia, the second piece of the second indicia, the first piece of the third indicia, the second piece of the third indicia, etc. By breaking each of the plurality of indicia into at least two pieces, less characters may be written at given locations periodically and longitudinally on the cable at the predetermined distances apart. With fewer characters to write at the given locations, more time may be spent writing each individual character at a given location. Consequently, the writing quality may be increased. Writing quality may be a function of the depth at which a laser-written character is written or the amount of ink used to write an ink-written character, for example.

Furthermore, as stated above, each individual indicia may comprise a unique code and a sequential number portion. With respect to the broken pieces example above, the first pieces may comprise the unique codes and the second pieces may comprise a sequential number portion (e.g., a footage marker). Consequently, an alternating arrangement may be provided. In other words, footage markers and unique codes may be alternated periodically and longitudinally on the cable a predetermined distance apart.

In addition, the periodic distance at which individual indicia and/or indicia pieces are placed on the cable may be calculated based on a desired writing quality and the number of characters to be written for each individual indicia and/or indicia piece at a given location. For example, for a given line speed and a given number of characters to be written, the periodic distance between individual indicia and/or indicia pieces may need to be X. However, if the same writing quality and character number is to be maintained at a higher line speed, the distance may need to be increased to X+n. Similarly, if the line speed can be decreased, the distance may be decreased to X−n with a given quality level being maintained.

Consistent with embodiments of the invention, each one of the plurality of indicia may be configured not to interfere with proper termination of the cable. For example, the indicia may be themselves conductive and may not include paints, varnishes, and other coverings that may need to be removed before termination. Notwithstanding, the indicia may be conductive or nonconductive and may be configured to be removed from the conductor when the cable including the conductor is terminated. For example, the indicia may be configured to be removed by a technician by brushing the indicia away with a wire brush.

Furthermore, the indicia may be "tamper proof." For example, the indicia may be placed on a conductor, conductors, or on any layer of the cable in such a way that it may be difficult to be removed by a potential thief. For example, laser etching may be difficult to be removed by a potential thief. Furthermore, the volume of indicia placed on the cable may make it impractical for a potential thief to remove all indicia from the cable.

Moreover, the indicia may not only comprise a sequential number (e.g. that visually presents itself as sequential), but also a code that may not be a set of numbers at all (e.g., has no visual appearance as a sequence). The indicia may be a series of letters, dots, characters, markings of any type (or any combination thereof) that may be generated by an encryption algorithm. A so encrypted indicia could be decrypted when need be.

Consistent with embodiments of the invention, a indictor or plurality of indicators may be placed on the product. For example, an indicator may be included with the indicia, may be placed on the product (e.g. the cable) in addition to the indicia, or may be placed on the product with no relation to the indicia. The indicator may be placed, for example, using any of the aforementioned processes for placing the indicia (e.g. a laser source, chemical etching process, high temperature/high adhesion ink, high speed indexing printing wheel, etc.). The indicator may comprise a highly visible logo or other insignia type that may be visible at a distance from the product. The indicator may identify the product as having a theft deterrent feature. In this way, seeing the indicator may communicate to a potential thief that the product can be traced thus providing a deterrent to thief. Notwithstanding, the indicator may be placed on any layer or layers of the cable or on any conductor or conductors of the cable.

Figure 5:
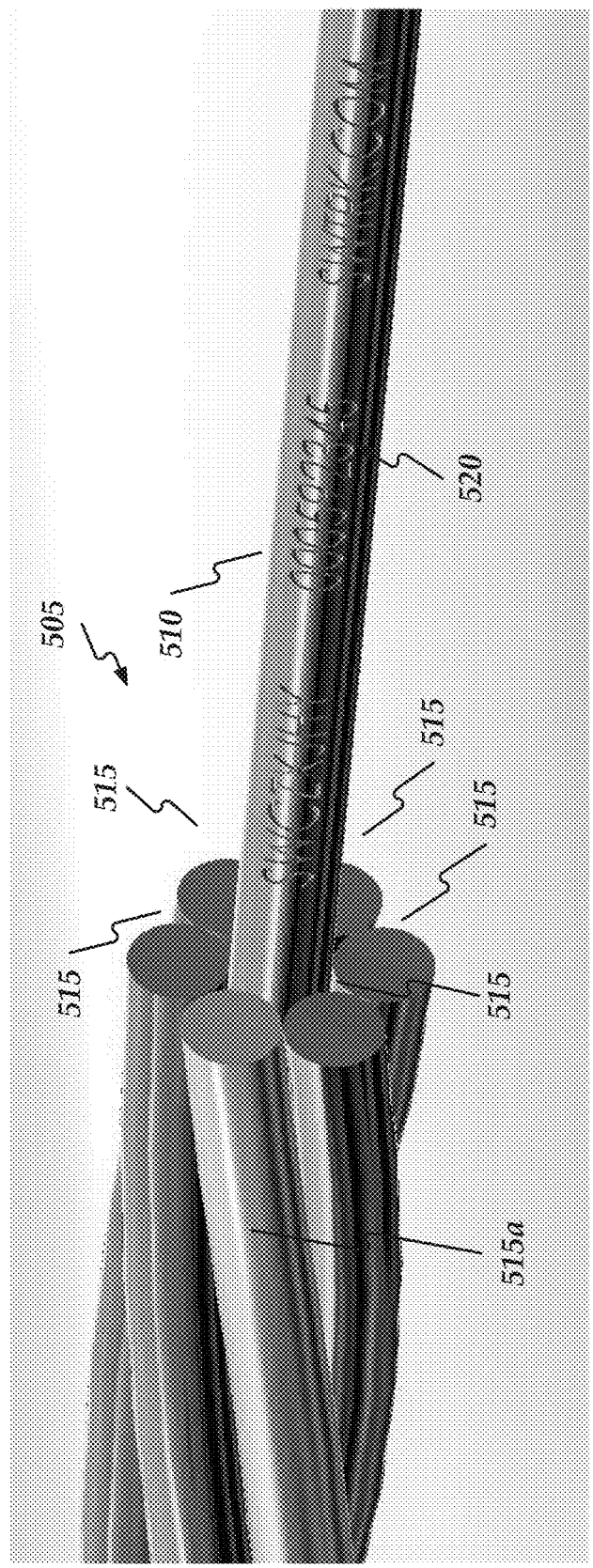
FIG. 5 is a diagram illustrating a cable having an indicator.

FIG. 5 is a diagram illustrating a cable 505 consistent with embodiments of the invention. As shown in FIG. 5, cable 505 may comprise, but is not limited to, a stranded electrical conductor having a center strand 510 and any number of outer strands 515 or layers stranded around center strand 510. As stated above, indicia may be placed anywhere on any layer or surface on a product (e.g. a cable) consistent with embodiments of the invention. The indicia may be placed in such a way that the indicia are not visible from the exterior of the cable. For example, an indicia 520 may be placed on center strand 510, under outer strands 515. As shown in FIG. 5, portions of outer strands 515 may need to be removed from center strand 510 in order to expose indicia 520 that would otherwise be covered by one or more of outer strands 515.

Indicia 520 may comprise one of a plurality of indicia placed periodically and longitudinally on center strand 510, under outer strands 515. Because indicia 520 may not be on an exterior surface of cable 505, indicia 520 may only be visible after some or all of outer strands 515 are removed. Accordingly, cable 505 may include an indicator comprising, for example, a highly visible logo, other insignia type, or any other type of indicator that may be visible at a distance from cable 505. The indicator may identify cable 505 as having a theft deterrent feature. In this way, seeing the indicator may communicate to a potential thief that cable 505 can be traced, thus providing a deterrent to thief. Similarly, the indicator may identify cable 505 as having a theft deterrent feature to, for example, a scrap dealer, a customer, a law enforcement agency, or any other third party. It may be communicated or other wise published to the general public, scrap dealers, customers, law enforcement agencies, or to anyone that the indicator means that a product bearing the indicator means that the product has a theft deterrent feature.

As shown in FIG. 5 the indicator, for example, may comprise one or more of outer strands 515 being different (e.g. visibly different) from the rest of outer strands 515. For example, one or more outer strands 515 (e.g. a strand 515a) may comprise a tin-coated copper strand while the remainder of outer strands 515 may comprise copper. In this way, strand 515a may be shinier than the rest of outer strands 515 and thus visibly different from the rest of outer strands 515. Also, strand 515a coated with tin may oxidize at a much slower rate than copper, thus it may create a visual contrast that may last through the life of cable 505. Consequently, cable 505 may include an indicator that may be visible at a distance from cable 505 when one or more of outer strands 515 is different (e.g., visibly different) from the rest of outer strands 515.

Once product processor 205 creates the plurality of unique codes and places the plurality of indicia periodically and longitudinally on the cable in stage 310, method 300 may continue to stage 320 where product processor 205 may assign, in a database (e.g. a database 440 as described below with respect to FIG. 4), the plurality of unique codes to an organizational entity. The organizational entity may comprise a first enterprise. For example, the first enterprise may comprise, but is not limited to, an enterprise that is to distribute the cable, an enterprise that is purchasing the cable an enterprise for which the cable is being manufactured, or an enterprise that is to install the cable.

After product processor 205 assigns the plurality of unique codes to the organizational entity in stage 320, method 300 may proceed to stage 330 where product processor 205 may receive an indication that the cable is to be transferred from the first enterprise to a second enterprise. For example, using first enterprise processor 210, the first enterprise may communicate with product processor 205 over network 215. Through this communication, the first enterprise may indicate that the ownership of a particular amount of cable is being transferred to the second enterprise. In this communication, the first enterprise may specify a series of the plurality of unique codes corresponding to the cable who's ownership is being transferred from the first enterprise to a second enterprise.

From stage 330, where product processor 205 receives the indication that the cable is to be transferred from the first enterprise to the second enterprise, method 300 may advance to stage 340 where product processor 205 may assign in database 440, in response to the received indication, the plurality of unique codes from the organizational entity comprising the first enterprise to the organizational entity comprising the second enterprise. For example, the second enterprise may comprise an enterprise purchasing the cable, an enterprise that is to distribute the cable, an enterprise for which the cable is being manufactured, and an enterprise that is to install the cable. For example, the first enterprise may be a cable distributor and the second enterprise may be an entity purchasing the cable from the cable distributor. In addition, the first enterprise may be and entity for which the cable is being manufactured and the second enterprise may be an entity that the first enterprise has contracted with to install the cable. Moreover, the first enterprise may be an entity for which the cable is being manufactured and the second enterprise may be an entity purchasing the cable from the first entity.

Once product processor 205 assigns the plurality of unique codes from the first enterprise to the second enterprise in stage 340, method 300 may continue to stage 350 where product processor 205 may receive an input. For example, the input may be received from a reclaimer operating reclaimer processor 220. The reclaimer may comprise, but is not limited to, an enterprise that recycles materials (e.g. copper or aluminum.) In this example, the second entity may bring cable to the reclaimer. The reclaimer may record codes from indicia from the cable brought for recycling. For each piece of cable, the reclaimer may record a code closest to a first end of the cable and a code closets to a second end of the cable. Notwithstanding, the reclaimer may record any one or more codes shown in indicia from the cable brought for recycling. Next, using reclaimer processor 220, the reclaimer may communicate these recorded code numbers to product processor 205 through the input.

After product processor 205 receives the input in stage 350, method 300 may proceed to stage 360 where product processor 205 may determine if the input corresponds to any one of the plurality of unique codes. For example, from the received input, product processor 205 may extract the recorded codes submitted by the reclaimer in the input. Then the recorded codes from the input may be compared against codes that have been previously saved in database 440 and assigned to certain organizational entities. Consequently, product processor 205 may determine that respective matches exist between one or more of the recorded codes from the input and one or more unique codes previously saved in database 440.

From stage 360, where product processor 205 determines if the input corresponds to any one of the plurality of unique codes, method 300 may advance to stage 370 where product processor 205 may determine the organizational entity to which the plurality of unique codes are assigned. For example, product processor 205 may determine that the recorded codes from the input match codes previously assigned to the second enterprise. Consequently, product processor 205 may transmit an output to reclaimer processor 220 indicating that the determined organizational entity is the second enterprise. Moreover, product processor 205 may determine that the recorded codes from the input do not match codes previously assigned to the second enterprise. Consequently, product processor 205 may transmit the output to reclaimer processor 220 indicating that the determined organizational entity is not the second enterprise. From the output, the reclaimer is better able to determine if the cable brought for recycling should be purchased from the entity bringing the cable. Once product processor 205 determines the organizational entity to which the plurality of unique codes are assigned in stage 370, method 300 may then end at stage 380.

Figure 4:
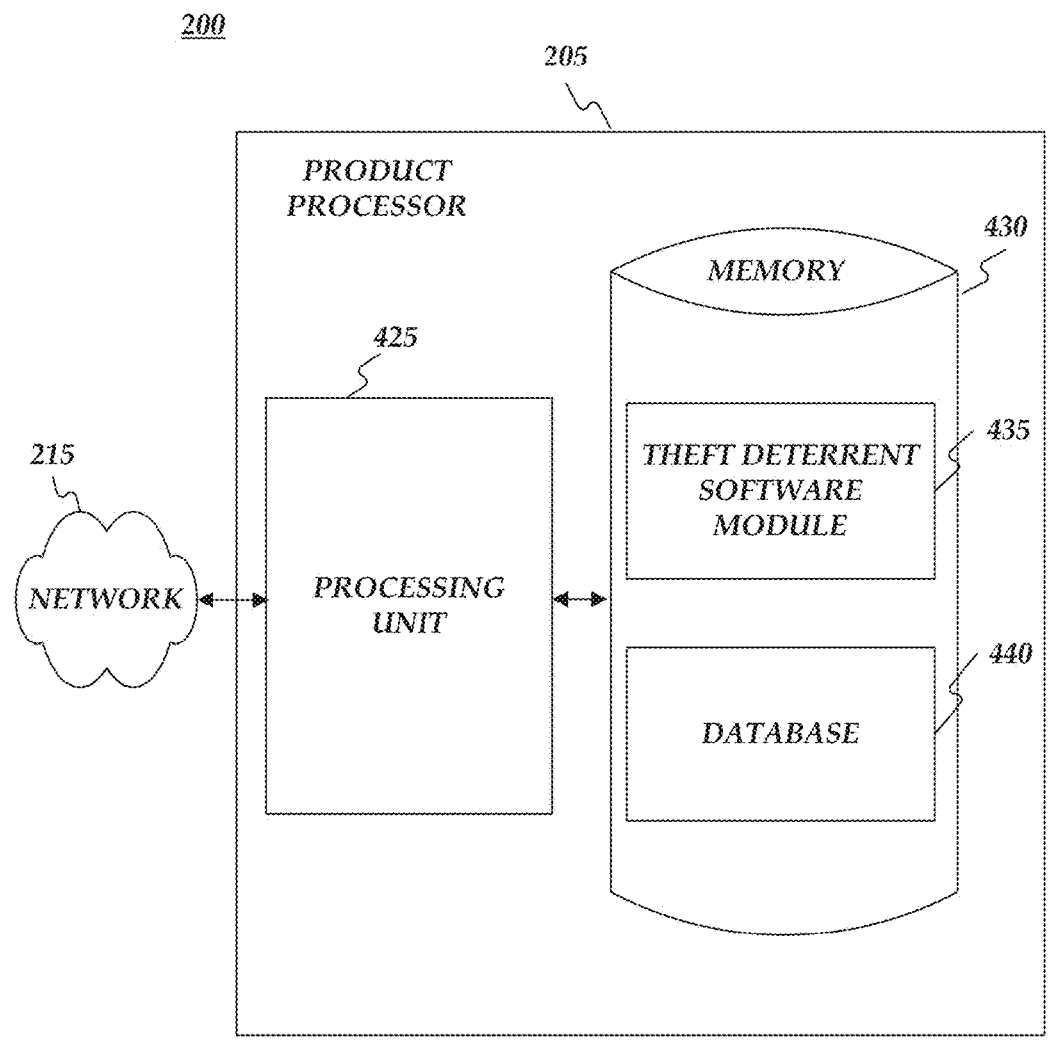
FIG. 4 is a block diagram of a product processor.

FIG. 4 shows product processor 205 of FIG. 2 in more detail. As shown in FIG. 4, product processor 205 may include a processing unit 425 and a memory 430. Memory 430 may include theft deterrent software module 435 and database 440. First enterprise processor 210 and reclaimer processor 220 may comprise similar structures. While executing on processing unit 425, deterrent software module 435 may perform processes for providing a theft deterrent cable, including, for example, one or more method 300 stages described above with respect to FIG. 3. Furthermore, one or more method 300 stages may be performed by first enterprise processor 210 or reclaimer processor 220.

Product processor 205, first enterprise processor 210, and reclaimer processor 220 ("the processors") included in system 200 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processors may comprise other systems or devices.

Network 215 may comprise, for example, a local area network (LAN) or a wide area network (WAN). When a LAN is used as network 215, a network interface located at any of the processors may be used to interconnect any of the processors. When network 215 is implemented in a WAN networking environment, such as the Internet, the processors may typically include an internal or external modem (not shown) or other means for establishing communications over the WAN. Further, in utilizing network 215, data sent over network 215 may be encrypted to insure data security by using known encryption/decryption techniques.

In addition to utilizing a wire line communications system as network 215, a wireless communications system, or a combination of wire line and wireless may be utilized as network 215 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g., general packet radio system (GPRS), enhanced data rates for global evolution (EDGE), global system for mobile communications (GSM)), a wireless local area network interface (e.g., WLAN, IEEE 802, WiFi, WiMax), a bluetooth interface, another RF communication interface, and/or an optical interface.

System 200 may also transmit data by methods and processes other than, or in combination with, network 215. These methods and processes may include, but are not limited to, transferring data via, diskette, flash memory sticks, CD ROM, facsimile, conventional mail, an interactive voice response system (IVR), or via voice over a publicly switched telephone network.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing a theft deterrent cable, the method comprising:
   creating a plurality of unique codes;
   etching a plurality of indicia periodically and longitudinally on a conductive layer of the cable, the plurality of indicia respectively corresponding to the plurality of unique codes, wherein the plurality of indicia are not visible from an exterior of the cable, wherein the exterior of the cable comprises a plurality of stranded conductors forming an exterior conductive layer, the exterior conductive layer being an outermost layer of the cable; and
   placing an indicator in the exterior conductive layer wherein the indicator comprises one of the plurality of stranded conductors having a surface layer comprising a first material coated on a second material, the first material being shinier than a third material comprising others of the plurality of stranded conductors.

2. The method of claim 1, further comprising assigning, in a database, the plurality of unique codes to an organizational entity, the organizational entity comprising a first enterprise.

3. The method of claim 2, further comprising: receiving an indication that the cable is to be transferred from the first enterprise to a second enterprise; and assigning in the database, in response to the received indication, the plurality of unique codes from the organizational entity comprising the first enterprise to the organizational entity comprising a second enterprise.

4. The method of claim 3, wherein assigning in the database, in response to the received indication, the plurality of unique codes from the organizational entity comprising the first enterprise to the organizational entity comprising the second enterprise wherein the second enterprise comprises at least one of the following: an enterprise purchasing the cable, an enterprise that is to distribute the cable, an enterprise for which the cable is being manufactured, and an enterprise that is to install the cable.

5. The method of claim 2, further comprising:
receiving an input; determining if the input corresponds to any one of the plurality of unique codes;
determining, when it is determined that the input corresponds to the any one of the plurality of unique codes, the organizational entity to which the plurality of unique codes are assigned; and
transmitting an output indicating the determined organizational entity.

6. The method of claim 1, wherein placing the indicator in the exterior conductive layer comprises placing the indicator in the exterior conductive layer wherein the first material comprises tin and the third material comprises copper.

7. The method of claim 1, wherein each of the plurality of indicia includes a sequential number portion corresponding to a sequential number that is incremented by an amount equal to a predetermined distance along the cable.

8. A method for providing a theft deterrent cable, the method comprising:
creating a plurality of unique codes;
etching a plurality of indicia periodically and longitudinally on a conductive layer of the cable, the plurality of indicia respectively corresponding to the plurality of unique codes, wherein the plurality of indicia are not visible from an exterior of the cable, the exterior of the cable comprising a plurality of stranded conductors being an outermost layer of the cable; and
placing an indicator comprising at least one of the plurality of stranded conductors comprising a first material disposed on the at least one of the plurality of stranded conductors comprising a second material, the first material being visibly different from a third material comprising at least a surface of all others of the plurality of stranded conductors wherein the first material is different from the second material.

9. The method of claim 8, wherein placing the indicator comprises placing the indicator wherein the first material comprises tin.

10. The method of claim 8, wherein each of the plurality of indicia includes a sequential number portion corresponding to a sequential number that is incremented by an amount equal to a predetermined distance along the cable.

11. The method of claim 8, wherein placing the indicator comprises placing the indicator wherein the first material is shinier than the third material.

12. The method of claim 8, wherein placing the indicator comprises placing the indicator wherein the first material comprises tin and the third material comprises copper.

13. The method of claim 8, wherein placing the indicator comprises placing the indicator wherein the first material comprises tin.

14. The method of claim 8, wherein placing the indicator comprises placing the indicator wherein the second material comprises copper.

15. The method of claim 8, wherein placing the indicator comprises placing the indicator wherein the second material comprises copper and the third material comprises copper.

16. The method of claim 8, wherein placing the indicator comprises placing the indicator wherein the first material comprises tin, the second material comprises copper, and the third material comprises copper.

17. A method for providing a theft deterrent cable, the method comprising:
creating a plurality of unique codes;
etching a plurality of indicia periodically and longitudinally on a conductive layer of the cable, the plurality of indicia respectively corresponding to the plurality of unique codes, wherein the plurality of indicia are not visible from an exterior of the cable, the exterior of the cable comprising a plurality of stranded conductors; and
placing an indicator comprising at least one of the plurality of stranded conductors comprising a first material disposed on the at least one of the plurality of stranded conductors comprising a second material, the first material being visibly different from a third material comprising at least a surface of at least another of the plurality of stranded conductors wherein the first material is different from the second material, wherein the second material comprises copper and the third material comprises copper.

18. The method of claim 17, wherein placing the indicator comprises placing the indicator wherein the one of the plurality of stranded conductors consists of the second material and the first material, the others of the plurality of stranded conductors consist of the third material.

19. The method of claim 17, wherein placing the indicator comprises placing the indicator wherein the at least one of the plurality of stranded conductors consists of the first material and the second material, all others of the plurality of stranded conductors consist of the third material.

20. The method of claim 17, wherein placing the indicator comprises placing the indicator wherein the at least one of the plurality of stranded conductors consists of the first material and the second material, the at least another of the plurality of stranded conductors consists of the third material.

* * * * *